Jan. 6, 1942.  G. DREWETT  2,268,577
CONSTRUCTION OF EXTERNALLY SCREW-THREADED MEMBERS
Filed March 25, 1939
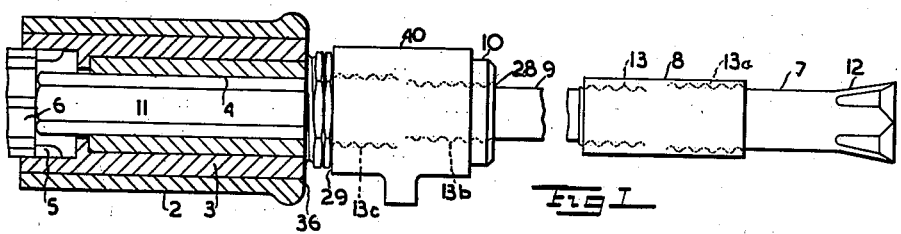
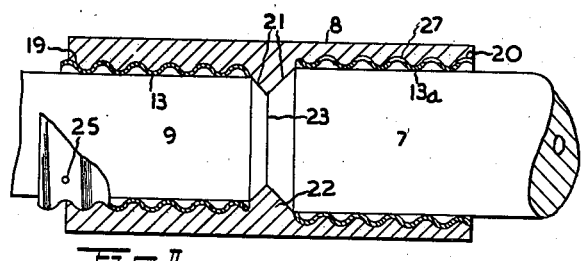
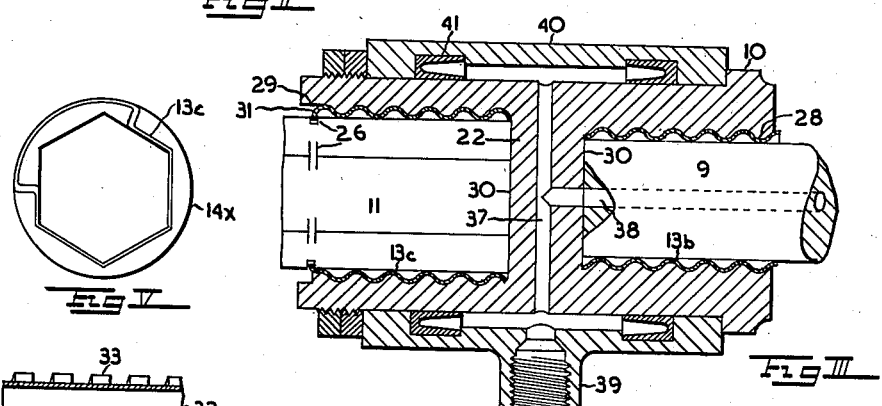
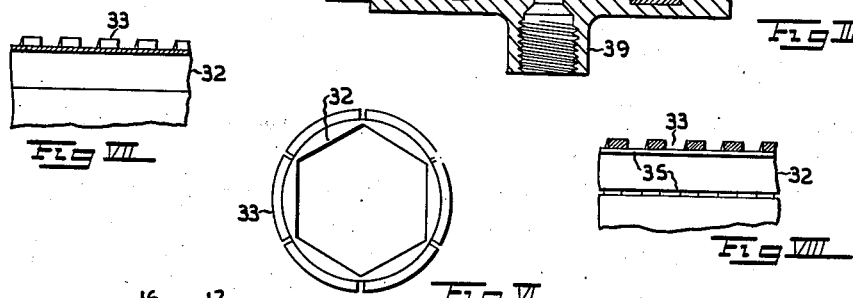
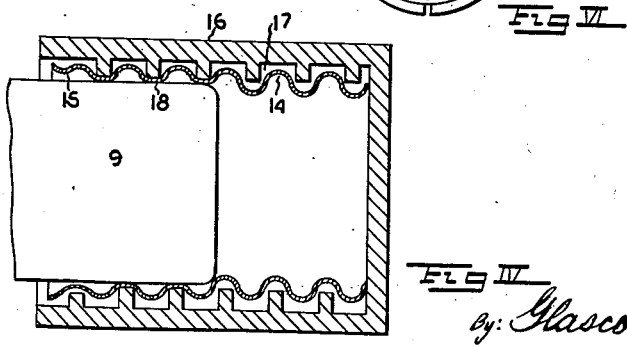
Inventor,
G. Drewett
by: Glascock, Downing & Seebold
Attys.

Patented Jan. 6, 1942

2,268,577

UNITED STATES PATENT OFFICE 2,268,577

CONSTRUCTION OF EXTERNALLY SCREW-THREADED MEMBERS

George Drewett, Johannesburg, Transvaal, Union of South Africa

Application March 25, 1939, Serial No. 264,275

4 Claims. (Cl. 287—125)

This invention relates to shafts, stems or like elongated members provided with external screw-threads for connection to internally screw-threaded members. It relates particularly to such members having external screw-threads at or near their ends and intended to screw into an internally screw-threaded socket with which the member becomes rigidly connected by contacting with the bottom of the socket.

One of the objects of the invention is to provide connective screw-threading upon members, such as, shafts, stems or the like which for various reasons are not suitable to have screw-threads machined from their substance. For example a raised screw-thread cannot be formed as an integral portion of a long shaft without machining down the remainder of the length of the shaft; whilst in the case of rock drill steel it is inadvisable to forge the steel as it is delivered by the makers, or to reduce its section. A particular object of the invention is to construct percussive rock drill tools built up of two or more parts which are connected by screwing and which include at least one length of rock drill-steel which retains its "as rolled" properties.

Another object of the invention is to provide a stem or the like with screw-threads which can be renewed from time to time, and which have a degree of flexibility relatively to the stem.

An externally screw-threaded structure according to the invention consists of a non-screw-threaded stem or shaft and a sleeve fixed externally thereon, said sleeve providing an external and uniform screw thread.

Preferably the sleeve is of thin metal and is fixed on the stem by making the interior of the sleeve of less diameter than the stem, and relatively forcing it without heating it over the stem so as to expand the metal of the sleeve throughout its thickness; that is so that there is increase of both the internal diameter and the external diameter of the portion of the sleeve which contacts with the stem.

The invention is illustrated in the accompanying drawing in which.

Figure I is a longitudinal view of a built-up rock drilling tool seated in operative position in the front end of a rock drilling machine, which is shown in section.

Figure II is an enlarged and longitudinal section of the coupling 8 of Figure I.

Figure III is a similar view of the member 10 of Figure I.

Figure IV shows a sleeve and illustrates the method of fixing the sleeve by expanding it.

Figure V is an end view of the sleeve 13c of Figure III.

Figure VI is an end view of an alternative form of sleeve.

Figure VII is a part longitudinal section of the sleeve of Figure VI.

Figure VIII is a view similar to Figure VII, showing a modification.

Figure IX is a view similar to Figures VII and VIII showing a reinforced sleeve.

The percussive rock drilling tool shown in Figure I is for use with a hammer rock drilling machine of which only the relevant parts are shown viz. a chuck casing 2, a chuck 3 rotatable therein and having a polygonal bore 4 to receive the tool shank and internally fluted at its rear end 5 to be engaged for rotation by the similarly fluted nose 6 of the hammer piston, and the hammer piston of which only the nose 6 is shown and which strikes the rear end of the tool and also rotates the chuck 3, and with it the tool.

The tool comprises a detachable cutting bit 7, a coupling 8, a stem 9, a member 10 which acts as a coupling and also performs other functions, and a shank 11.

The stem 9 is formed of rock drill steel of circular section and in its "as rolled" condition. In that condition it is too hard to be conveniently machined and also it has been brought by proper heat treatment to the physical condition most suitable to withstand the disintegrating effect of rapid and severe longitudinal blows. Its cross section is uniform throughout and of the greatest diameter that will operate freely in a rock hole bored by the cutting end 12 of the bit 7.

13 is a sleeve mounted on the forward end of the stem 9, which end is not changed from its "as rolled" condition. The sleeve is shown to an enlarged scale in Figure IV. It may be manufactured from drawn mild steel or alloy tubing of about 26 gauge, from the wall of which there is pressed out an external screw-thread 14 which is uniform throughout its length.

In the preferred process of attaching the sleeve to the end of the stem the internal diameter of the sleeve is made less than the diameter of the stem 9; for instance said internal diameter may be about $\frac{15}{16}$ inch when the diameter of the stem 9 is one inch. One end 15 of the sleeve is flared to be larger than the stem so that the latter easily enters it.

The manufactured sleeve is inserted into a hollow socket 16 the internal wall of which is made with a helical formation 17, of the same pitch as the screw thread 14 and loosely fitting said thread. Then without heating the sleeve, the end of the stem 9 is forced fully into the sleeve, the function of the socket 16 during this operation being to support the sleeve against collapse by the endwise pressure of the stem during this operation. The socket 16 shown is a temporary holding socket which is removed after the stem has been forced into the sleeve; but it may be the regular internally screwed socket such as those hereafter described, with which the stem and sleeve combination is intended to work.

The forcing-in of the stem expands the sleeve—or at least those portions of it indicated by 18 which make actual contact with the stem; and at those portions at least, the whole thickness of the metal is stretched so that the inside and outside diameters of said portions are both increased. In this way the operation is different from the ordinary operation of making a forced fit connection between a shaft and a bored member, where the bored member is too thick and rigid to be expanded as a whole and the relative entry of the shaft is accompanied by local compression of surface layers of the metal.

The cutting bit 7 is a short piece of rock drill steel which is fitted at its rearward end with a screw sleeve 13a much like the sleeve 13. Its forward end is formed as a conventional cutting end 12 for a percussive rock drilling tool. In the example shown the steel of the cutting bit is of greater diameter than the steel forming the stem 9.

The coupling 8 provides the screwed sockets 19, 20 at its ends to receive respectively the sleeved end of the stem and the sleeved end of the cutting bit. Each socket provides a base against which the end face of the stem or cutting bit respectively abuts and so causes the sleeved ends of said members to lock rigidly with the coupling 8. In the example shown, each socket base is provided partly by the faces 21 of an internal flange or partition 22 in the coupling and partly by the end face 23 of the opposite member; but such base may be provided entirely by the flange or partition 22 as shown in Figure III or by the opposite end face 23 of the second coupled member. Provided the ends of the screwed members butt firmly against the socket base, the external diameter of the coupling can successfully be so limited that the coupling easily passes into the hole formed by a cutting end 12 of conventional diameter relatively to the drill steel on which it is formed. For example drill steel parts of one inch diameter are found to be rigidly and securely coupled together by a coupling of not more than about one and one eighth inch outside diameter.

Each of the sleeves described, for instance sleeve 13, by its resistance to expansion by the stem, maintains a firm frictional grip on the stem which is found to be sufficient to hold it immovable thereon under the conditions in which it functions in the drill tool, that is when the stem enters the socket in the collar, when the direction of rotation is such as to tend to tighten the screw connection, and when the main stresses to be transmitted are the compressive stress due to the blows of the hammer piston and tending to force the stem end into the socket; and the torsional stress due to the tool being rotated by the tool chuck 3, with sufficient torque to overcome the resistance offered to the rotation of its cutting end 12 in the bore hole. Under these conditions it is generally undesirable to provide further means for fixing the sleeve, since without them it is easy to renew the sleeve when necessary, by simply splitting or drawing it off the stem. Nevertheless, the sleeve may be made more secure, if desired. Figure IX shows the interior of the pressed out screw thread filled with friction exerting material 24 such as lead or rubber which increases the area of the frictional contacting surface of the sleeve. Also positive fixing means may be employed such as a few spots 25 (Figure II) of spot-welding, or a channel 26, Figure III, into which a rim of the sleeve is pressed. However, if such positive securing means is used, it should be arranged not to tie the sleeve completely against longitudinal movement on the stem. One of the advantages of the invention as applied to a socketed joint transmitting endwise compressive stress, is that such stress tends to compress the abutting surfaces such as 21, 23 at which the stress is transmitted and thereby bring the abutting parts closer together during use. The frictionally held sleeve is capable, under sufficient force, of slight sliding movement relatively along the stem to allow this adjustment, whereas an integral screw thread has not this freedom. The sleeve described has a substantial degree of flexibility so that fixing it, as by spot welding, at one part of its length does not prevent the adjusting action described. Also the flexibility enables the abutting surfaces such as 23 to come together with a good seating, even if they are not initially quite parallel with one another.

The flexibility and elasticity of the sleeve may be increased by slitting it in various ways. As an example the sleeve 13a is shown as slit part way through the screw thread formation by one or more longitudinal cuts 27.

The rear end of the stem 9 is fitted with a sleeve 13b like the sleeve 13 or 13a; and is screwed into a corresponding socket 28 in the member 10. The latter is formed with a second socket 29 into which is screwed the sleeved forward end of the shank 11. The bases of the sockets in this case are provided entirely by the internal flange or partition 22; and the ends of the shank and stem are made plane to seat firmly on the corresponding faces 30 of said partition. The shank is also a plain length of drill steel in the as-rolled condition, but is formed of polygonal steel in order that it may engage in the similarly polygonal bore 4 of the chuck to be rotated by the latter.

Its sleeve 13c, which is shown separately in end view in Figure V, is internally polygonal but the screw thread formation 14x is circular; the sleeve being made from a drawn polygonal tube out of the wall of which the screw thread is pressed. It is evident that non-rotation is ensured by the polygonal shape of the stem and the sleeve bore; the frictional grip if used having only to resist axial movement of the sleeve on the shank. By way of example this sleeve is shown as being positively fixed also against longitudinal movement by its end rim 31 being pressed, after the sleeve is in position on the shank, into grooving 26 in the shank. Provided such grooving is sunk from the corners of the polygonal steel not deeper than the flat surfaces thereof, the useful cross-section of the steel is not materially reduced.

Figures VI and VII show the sleeve 32 produced from thick metal by machining out the screw thread formation 33. In the case shown the interior bore is polygonal. Longitudinal slitting is shown applied to this sleeve chiefly to make it sufficiently expansible to be pressed onto the rock drill steel part to which it belongs. The slitting is shown as being cut through the thread formation 33 leaving the body portion of the sleeve easier to stretch. Figure VIII shows a modification in which the body portion is slit at 35 leaving the screw thread 33 to hold the sleeve together.

Besides acting as a coupling, the member 10 also performs the function of a collar to take the forward pressure of the drilling machine on the tool; being for this purpose made of substantial diameter to bear against the nose 36 of the machine. The shank 11 is made of such length that when such bearing occurs, the rear end of the shank is in the correct position to be struck by the nose of the hammer piston.

Said member is further utilized to convey water into the bores of the stem and the bit, which are made of hollow steel, for the purpose of conveying water to the cutting end 12; whereas the shank 11 is made solid with the object of excluding water from the drilling machine. For this purpose the partition 22 is provided with one or more radial holes 37 and with an axial bore 38 with which such radial hole or holes communicate and which in turn communicates with the bore of the stem. Water is fed to said radial holes 37 from a connection 39 by way of a hollow casing 40 which is rotatably mounted on the casing 10 and makes a water-tight joint therewith by packing 41.

I claim:

1. An externally screw-threaded member comprising a rigid metal non-screw-threaded stem and a circumferentially complete sleeve of thin metal formed with local slitting increasing its flexibility and providing an external hollow screw-thread shaped out of the thin sleeve metal, said sleeve being expanded circumferentially onto the stem by relative pressing of the latter into it to effect binding frictional engagement between them whereby the sleeve is fixed to the stem.

2. The combination with a rigid metal non-screw-threaded stem, of a circumferentially complete sleeve of thin metal formed with local slitting increasing its flexibility and providing an external hollow screw-thread shaped out of the thin sleeve metal, said sleeve being fixed on the stem by being molecularly deformed to make binding frictional engagement therewith, and a hollow member providing an internally screw-threaded socket comprising a base, the stem and sleeve assembly being screwed into the socket with the end face of the stem abutting the base of the socket.

3. An externally screw-threaded member comprising a rigid metal non-screw-threaded stem and a sleeve of thin metal providing an external hollow screw-thread shaped out of the thin sleeve metal, said sleeve being expanded circumferentially onto the stem by relative pressing of the latter into it to effect binding frictional engagement between them whereby the sleeve is fixed to the stem, friction-exerting material being arranged within the hollow thread at its side facing the stem and increasing the area of frictional contact between the sleeve and the stem.

4. The combination with a rigid metal non-screw-threaded stem, of a sleeve of thin metal providing an external hollow screw-thread shaped out of the thin sleeve metal, said hollow thread having friction-exerting material arranged therein, said sleeve being fixed on the stem by being molecularly deformed to make binding frictional engagement therewith, said friction-exerting material increasing the area of frictional contact between the sleeve and the stem, and a hollow member providing an internally screw-threaded socket comprising a base, the stem and sleeve assembly being screwed into the socket with the end face of the stem abutting the base of the socket.

GEORGE DREWETT.